J. H. GIAUQUE AND C. HAESLER.
FRICTION CLUTCH.
APPLICATION FILED JUNE 14, 1920.
1,423,413. Patented July 18, 1922.
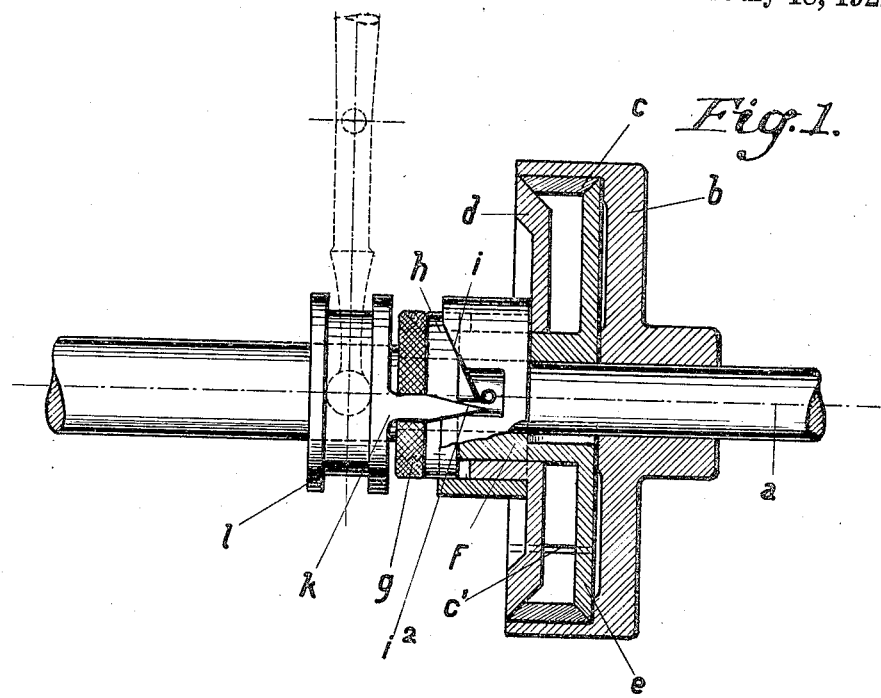
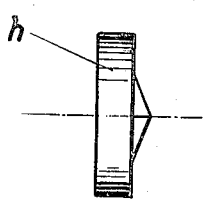
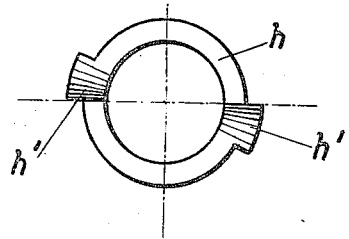
Inventors
J. H. Giauque
C. Haesler
by [signature] Att'y

UNITED STATES PATENT OFFICE.

JULES HENRI GIAUQUE AND CHARLES HAESLER, OF LE LOCLE, SWITZERLAND.

FRICTION CLUTCH.

1,423,413.  Specification of Letters Patent.  Patented July 18, 1922.

Application filed June 14, 1920. Serial No. 388,873.

*To all whom it may concern:*

Be it known that we, JULES HENRI GIAUQUE and CHARLES HAESLER, citizens of Switzerland, residing at Le Locle, Switzerland, Rue de la Concorde 43, and Petits Monts 6, respectively, have invented certain new and useful Improvements in a new or Improved Friction Clutch, of which the following is a specification.

In friction clutches, it is of great importance to avoid end thrust on the bearings. Further, it is very desirable to have no projecting parts in which the clothes of the operator can be caught. A third requirement is that the parts of the clutch by which the effort is transmitted should not be subject to abnormal wear, and that it should be possible to take up any wear that occurs at all times.

The object of the present invention is a friction clutch which presents the above advantages.

The new or improved clutch according to the invention, is characterized in that the driven member and the driving member are coupled by means of a split segment on one of the parts working in a drum fixed to the other part, the segment being caused to enlarge so as to apply its exterior surface against the inner surface of the drum. The use of this clutch is not limited, but is applicable wherever in the ordinary way couplings of this kind can be employed, that is to say, as well in machine tools as in transmission gear, and in motors of all kinds as well as in vehicles such as automobiles and motor cycles.

The accompanying drawing illustrates by way of example one form of the invention applied to the coupling of a loose pulley to its shaft.

Fig. 1 is an elevation partly in section of the improved clutch. Figs. 2 and 3 are views of a detail taken at right angles to each other.

In the drawing, $a$ is a shaft carrying a loose pulley $b$ of which the interior is hollowed out to form a drum. Within the said interior is situated a ring or band $c$ split at $c^1$ and bevelled as shown at both its edges. At each side of the segment are situated plates $d$ and $e$ of which the peripheries are formed as conical surfaces adapted to engage with the bevelled edges of the band $c$ as requisite. The disc $e$ is formed integrally with a sleeve $f$ threaded at its free end and carrying a milled nut $g$ of which the purpose will be explained later. On this sleeve is rotatably mounted a ring $h$ which is shown separately at Figs. 2 and 3, and carries two inclined lugs or extensions $h^1$ projecting beyond the external diameter of the ring.

The disc $d$ also has a sleeve on which is rotatably mounted a ring $i$ whose external diameter is equal to the overall diameter of the ring $h$ across the lugs $h^1$.

The ring $i$ is provided with two inclined cams adapted to cooperate with the lugs $h^1$ of the ring $h$. The cams extend inwardly from the rear edge of the ring and one of them leads to a slot or notch adapted to permit the introduction between a nose $h^1$ and the remote edge of the notch of a wedge $k$ formed on a clutch sleeve $l$ in the groove of which lies a fork adapted to move the sleeve axially on the shaft $a$.

The disc $e$ is keyed on the shaft $a$ and rotates therewith, and the disc $d$ and segment $c$ rotate with the disc $e$.

The clutch functions as follows:—

On the loose pulley passes a driving belt from a main shaft not shown. In order to engage the pulley (which in this case is the driving member of the clutch), with the shaft $a$, the fork engaged with the groove of the clutch sleeve $l$ is moved so as to cause the wedge $k$ to enter between a nose $h^1$ of the ring $h$ and the edge of the slot of the ring $i$. This causes the two rings to rotate relatively to each other along the inclined plane by which they are in contact, moving them apart axially, and thus separating the ring $g$ and plate $d$ with which they are in contact and forcing the plates $d$ and $e$ to move towards each other. The plates $d$ and $e$ thus enter within the split ring or band $c$, and as their external diameter is greater than the internal diameter of the band $c$ the latter is forced outwardly and applies itself with force on the whole of the interior surface of the drum $b$ and locks it with the shaft $a$ by means of the discs and of the key which fixes them to the shaft.

The wear produced by the momentary movement of the band on the drum whilst the clutch is engaging can be taken up without the necessity of renewing any element of the clutch. To take up a small amount of wear the rings merely travel a little further apart in operation; and when the travel is such that it absorbs the entire width of the wedge $k$, the rings are re-set closer together by screwing up the nut $g$ on the sleeve which carries it.

The described coupling has no part which projects and can be put on any machine without risk of accidents.

The surface of contact between the band and the box can be made of whatever width is necessary and adapted to all exigencies.

What is claimed as new, is:—

1. A friction clutch comprising a shaft, a drum rotatable thereon, a pair of discs, one of said discs being mounted on the shaft against rotation and the other disc being mounted on a hub formed on the first mentioned disc, a friction element adapted to be moved to engage the drum in the movement of the discs, a ring freely mounted on the said hub of the first disc, and a second ring mounted on a hub formed on the second disc, the said rings being formed to move axially of the shaft in a relative rotation thereof, a stop mounted on the hub of the first disc to prevent movement in one direction of the ring thereon, and separate means for producing a relative rotation of the rings.

2. A friction clutch comprising a shaft, a drum rotatable thereon, a pair of discs, a friction element adapted to be operated in the relative movement of the discs to engage the drum, one of said discs being mounted on the shaft against rotation, a pair of rings, one ring being carried by each disc, means for adjusting and preventing axial movement in one direction of the ring on the first mentioned disc, the rings being formed to move axially in relative rotation and a separate means for producing relative rotation of the rings.

3. A friction clutch comprising a shaft, a drum rotatable thereon, a pair of discs, a friction element carried by the discs adapted to engage the drum in the relative movement of the discs, a pair of rings carried by the discs, one ring being carried by each disc, and the ring on one disc being held against axial movement in one direction thereon, one ring being formed with a cut away portion forming a shoulder and a cam face, the other ring being formed with a projection forming a shoulder and a cam face, and an element adapted to engage between the shoulders for producing a relative rotation of the rings to move the discs in relation to each other.

4. A friction clutch comprising a driving member and a driven member, a friction element rotating with one of said members, a pair of elements adapted to operate the friction element to clutch in the relative movement of the elements, and means for producing a relative movement of the elements including a pair of rings, one ring being mounted on one element, held against axial movement in one direction thereon and formed with a cam surface, the other ring being formed with a cam surface adapted to engage the cam surface on the first mentioned ring, and an actuator adapted to engage between shoulders on the rings to cause a relative rotation thereof to rotatively move the elements to operate the friction element.

In testimony whereof we have hereunto set our hands in presence of two subscribing witnesses.

JULES HENRI GIAUQUE.
CHARLES HAESLER.

Witnesses:
EDGAR FAVRE,
HENIS WENGE.